United States Patent [19]

Greenfield

[11] 4,043,708
[45] Aug. 23, 1977

[54] RESILIENT MOUNTING FOR FAN MOTOR

[75] Inventor: John B. Greenfield, Fort Smith, Ark.

[73] Assignee: Rheem Manufacturing Company, New York, N.Y.

[21] Appl. No.: 656,783

[22] Filed: Feb. 10, 1976

[51] Int. Cl.² ............... F04B 17/00; F16F 15/00; H02K 5/24
[52] U.S. Cl. .................... 417/363; 62/507; 165/122; 248/18; 310/51
[58] Field of Search .......... 417/363, 424; 248/15, 248/18, 358 A; 98/43 R; 62/507; 165/122; 416/247; 415/119 G; 310/51, 91

[56] References Cited

U.S. PATENT DOCUMENTS

| | | | |
|---|---|---|---|
| 1,491,736 | 4/1924 | Polk | 417/363 |
| 1,569,845 | 1/1926 | Murphy | 98/43 R |
| 1,707,032 | 3/1926 | Thomson | 417/363 |
| 2,269,245 | 1/1942 | Blessing | 248/18 |
| 2,843,036 | 5/1958 | Quick | 98/43 R |
| 2,936,947 | 5/1960 | Staak | 417/363 |
| 3,154,704 | 10/1964 | Shaffer | 248/18 |
| 3,204,897 | 9/1965 | Lawrence | 248/358 A |
| 3,263,908 | 8/1966 | Kroker et al. | 417/363 |
| 3,317,124 | 5/1967 | Morrill | 248/18 |
| 3,847,330 | 11/1974 | Morrison | 417/363 |
| 3,865,517 | 2/1975 | Simmons et al. | 62/507 |
| 3,924,830 | 12/1975 | Collard et al. | 248/18 |

*Primary Examiner*—Carlton R. Croyle
*Assistant Examiner*—Thomas I. Ross
*Attorney, Agent, or Firm*—Allegretti, Newitt, Witcoff & McAndrews

[57] ABSTRACT

An improved motor mount assembly for fan motors includes a plurality of flexible cables connecting the end plates of the motor housing with a mounting bracket. The motor mount assembly may be used in combination with a bladed fan or a blower wheel fan. The cables retain the blower motor in proper position while providing sufficient flexibility to damp out vibrations which occur due to the operation of the fan motor. A combination sheet metal air discharge grill and fan motor mount assembly is also disclosed.

9 Claims, 9 Drawing Figures

RESILIENT MOUNTING FOR FAN MOTOR

BACKGROUND OF THE INVENTION

This invention relates to an improved motor mount assembly for fan motors.

Residential and commercial forced air, heating and air conditioning systems require air propulsion units. In addition to providing movement of air for the heating or cooling system, air propulsion units are often used in combination with condenser units or to supplement other heat transfer operations. Generally, such units are motor driven fans. These fans may be a blower wheel type or a multi-bladed type.

Heretofore, various means have been utilized to mount the motor which drives the fan. The mounting means generally comprise a sheet metal mounting bracket which is fastened directly to the motor housing. Wire or rod is often use for mounting such motors.

While these prior art structures provide adequate means for mounting a fan motor, vibrations which arise due to operation of the motor may create excessive noise and, in some instances, may result in failure of the mounting bracket. Thus, it is desirable to alleviate vibrations associated with the operation of the fan motor. Additionally, elimination of various parts such as mounting brackets is desirable.

SUMMARY OF THE INVENTION

In a principal aspect, the present invention comprises an improved motor mount assembly for fan motors of the type having a cylindrical housing with opposed end plates and a drive shaft extending outward from one of the end plates. The improved motor mount assembly includes a bracket which encircles the motor housing generally perpendicular to the axis of rotation of the output shaft. A plurality of flexible cables connect one or both end plates to the circumferential bracket. The bracket is attached to a louvered grill or other stationary support.

It is thus an object of the invention to provide an improved motor mount assembly for fan motors of the type having a generally cylindrical housing with opposed end plates and a drive shaft projecting from one of the end plates.

It is a further object of the present invention to provide a motor mount assembly which substantially eliminates vibrations due to operation of the motor.

Still another object of the present invention is to provide a motor mounting assembly of simple and economic construction.

One further object of the present invention is to provide a motor mounting assembly which may be utilized in combination with a blade fan or a wheel fan.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
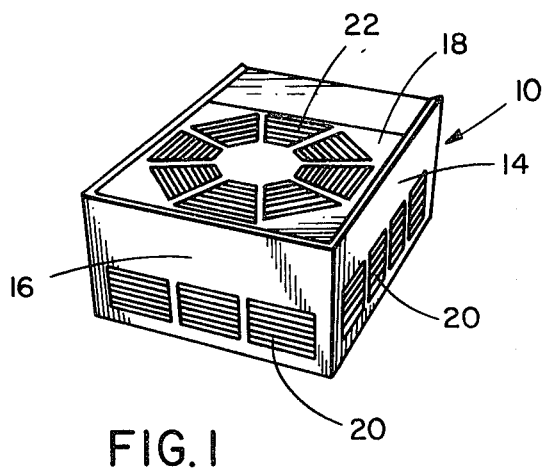
FIG. 1 is a perspective view of a typical air conditioning condenser unit which incorporates a mounted fan assembly.
Figure 2:
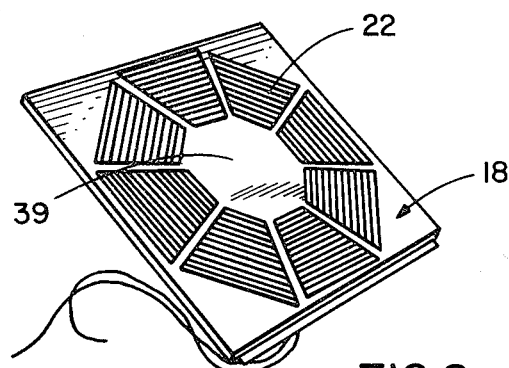
FIG. 2 is a perspective view of the top panel of the unit shown in FIG. 1.

FIG. 1 illustrates a typical condenser unit associated with an air conditioning system. The condenser unit is retained within a housing 10 and includes louvered side panels 14 and 16 and a louveredtop panel 18. A fan (19 in FIG. 3) is mounted within the housing 10. Air flows inward through louvers 20 in the side panels 14 and 16 and is exhausted through louvers 22 in the top panel 18. The motive force for driving the fan 19 is a fan motor 30. In the condenser unit illustrated, the fan motor is mounted on the top panel 18.

Figure 3:
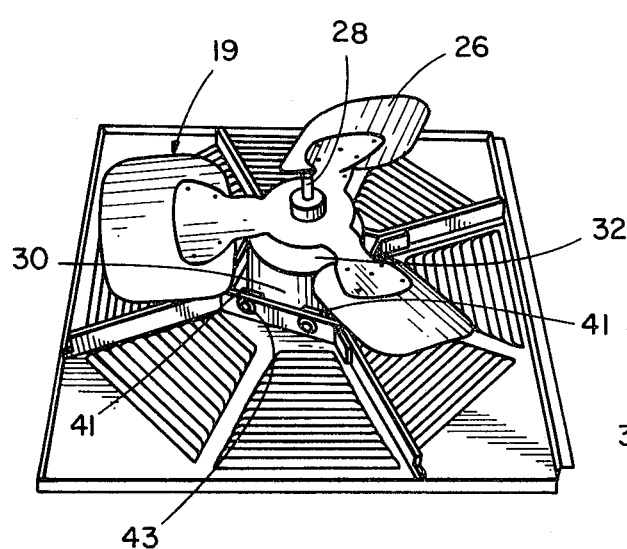
FIG. 3 is a perspective view of the underside of the panel illustrated in FIG. 2.
Figure 7:
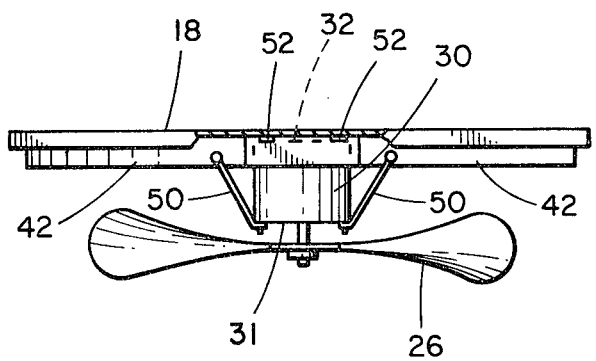
FIG. 7 is a side elevation of the assembly shown in FIG. 3.

Thus, referring to FIG. 3, a fan 19 with blades 26 is rotated by an output shaft 28 of the fan motor 30. The fan motor 30 has a generally cylindrical housing with opposed end plates 31 and 32 as shown in FIG. 7. The drive shaft 28 projects through end plate 31 for attachment to fan 19.

Figure 5:
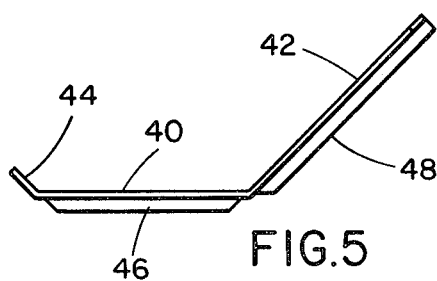
FIG. 5 is a top view of one of the bracket members forming the bracket assembly for the fan motor.
Figure 6:
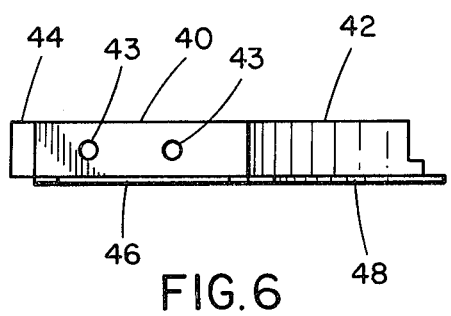
FIG. 6 is a side view of the bracket shown in FIG. 5.

A bracket assembly 33 comprised of four substantially identical bracket members 34-37 is attached to the inside surface of the top panel 18. Each bracket member 34-37 has a similar construction. Referring to FIGS. 5 and 6, a typical bracket member includes a bracket section 40 and a support or bracing section 42. The sections 40 and 42 define an included angle of 135°. The bracket section 40 terminates with a tab section 44. Tab section 44 forms an angle of 135° with bracket section 40. Note that each bracket section 40 and bracing section 42 also include a right angle extension, thereby giving sections 40 and 42 an L shape cross section. These extensions are identified as extensions 46 and 48, respectively, and assist in the attachment of the final bracket assembly 33 to the top panel 18. That is, extensions 46 and 48 may be welded to the top panel 18.

Figure 4:
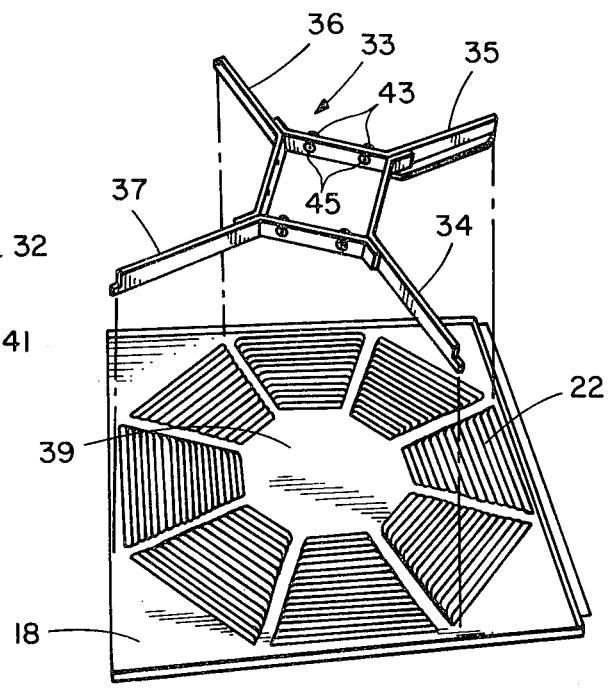
FIG. 4 is a partial exploded view of the panel of FIG. 3 wherein the motor and fan blade have been removed.

The four bracket members 34-37 are fitted together as shown in FIG. 4 to form an encircling bracket for the fan motor 30. The plane of the encircling bracket is generally perpendicular to shaft 28. The bracket assembly 33 formed in this manner is also square in shape and includes bracing sections 42 projecting from each corner of the square outwardly. Sections 42 attach to panel 18 and provide strength and support to top panel 18.

Within the included angle between adjacent projecting bracing sections 42, two sets of louvers 22 are included. The louvers 22 are formed in the sheet metal top panel 18 at an angle of inclination substantially equal to the angle of air flow leaving blades 26 of fan 19. Thus, as air is discharged through the top panel 18, resistance to air movement is reduced to a minimum.

Additionally, because of the unique structure of the bracket assembly 33, louvers 22 may be arranged about the entire circumference of the motor 30. Since air flow direction is circular leaving the fan blades 26, maximum air flow is achieved by operation of the motor 30 and fan 19. Also, a center section 39 of top panel 18 surrounded by louver 22 in combination with bracket assembly provides a rain shield over and around the motor 30 and motor end plate 32. Thus, motor 30 and motor end plate 32 may be provided with ventilation openings for cooling motor 30.

After the bracket assembly 33 is attached to the top panel 18, the fan motor 30 is placed in position. This may be accomplished by either of two methods. Both methods are illustrated in combination in the figures though they may separately support a motor 30.

In the first motor mounting method for panel 18, FIG. 7, flexible cable 50 connects from each bracing section 42 to the front end plate 32 of motor 30. The cables 50 are of substantially equal length and retain the motor 30 against the panel 18. Preferably, a resilient material 52 is inserted between the panel 18 and motor end wall 34 to further dampen sound and vibration. The cable 50 is typically a high strength flexible steel cable such as the type used for control of airplane control surfaces.

The second motor mount method for panel 18, FIG. 3, includes braces 41 which extend from motor 30 and are bolted through grommeted openings 43 to the bracket section 40 of assembly 42. Grommets 45 dampen vibration of motor 30.

Figure 8:
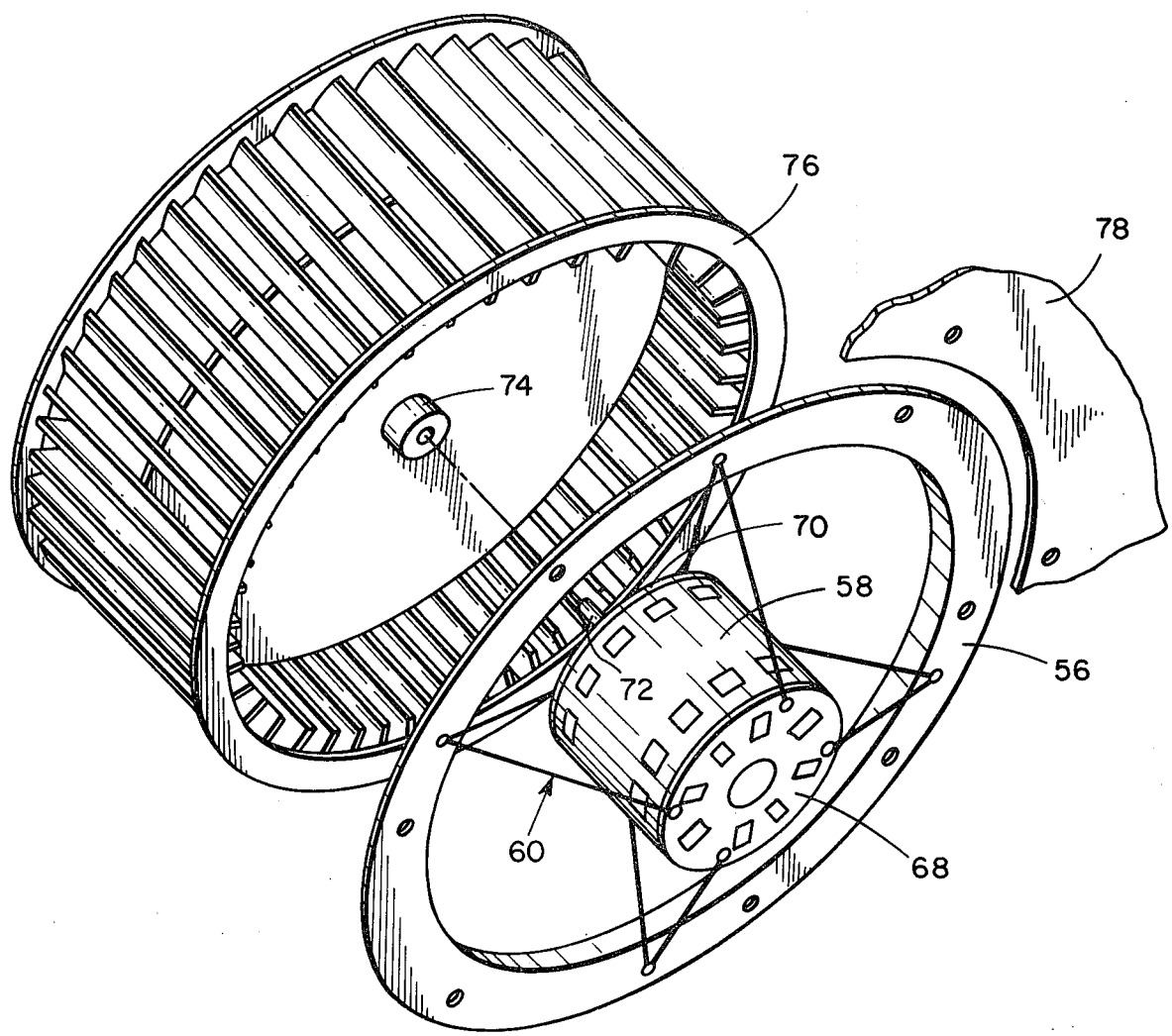
FIG. 8 is an exploded perspective view of a second embodiment of the invention.
Figure 9:
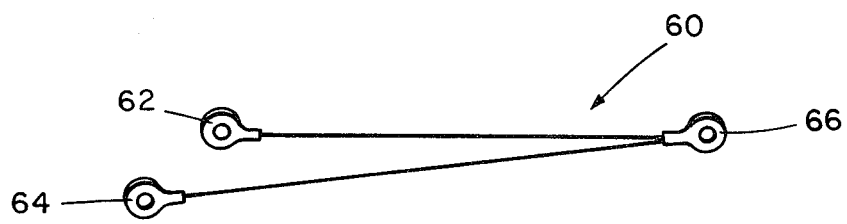
FIG. 9 is a plan view of the connecting cable used for mounting the motor shown in FIG. 8.

FIG. 8 illustrates an alternative embodiment of the invention. In the alternative embodiment a circular mounting bracket or ring 56 is provided. Motor 58 is mounted substantially at the center of the ring 56 by means of cables 60 as shown in FIG. 9. Each cable 60 includes opposite end eyelets 62 and 64 and a middle eyelet 66. The middle eyelet 66 is attached to the ring 56. Since four cables are utilized, attachment is effected at 90° intervals, though the illustrated arrangement is not a limitation.

The opposite end eyelets 62 and 64 are attached respectively to the back and front plates 68 and 70 of motor 58. Thus, shaft 72 of motor 58 projects along the axis of the motor 58 for cooperation with a hub 74 of wheel blower 76. The entire assembly may be mounted in an appropriate scroll 78 illustrated in part in FIG. 8.

In the embodiment of FIG. 8 as well as the other embodiments illustrated, the flexible cables 50 or 60 have been found to adequately retain the associated motor 30, 58 and fan in proper orientation. Additionally, in each installation, the flexible cable 50, 60 serves to substantially eliminate or diminish vibration and unwanted noise associated with the operation of the fan motor.

The embodiment utilizing the top panel 18 as a mounting bracket has the additional advantage of eliminating separate mounting brackets. The top panel has a universal function of bracket, louvered grill, and rain shield. Attachment of the motor is by flexible cable or direct bolt.

Thus, while there has been set forth a preferred embodiment, it is to be understood that the invention shall be limited only by the following claims and their equivalents.

What is claimed is:

1. An improved motor mount assembly for fan motors of the type having a housing with a generally cylindrical configuration, opposed end plates and a drive shaft extending outwardly from one end plate along the axis of rotation of the cylindrical housing, said assembly comprising, in combination:

a spaced, separate, generally circular bracket surrounding said motor housing, and forming a plane generally perpendicular to the axis of rotation generally intermediate the end plates;

a plurality of flexible cables for attaching the motor housing to the bracket, each cable having one end connected to the outer edge of one end plate and having the opposite end attached to the bracket, said cables being generally spaced in a radial direction outward from the center of the motor about the circumference of each motor end plate, and all connected to the bracket in the plane of the bracket to support the motor and prevent noise and vibration transmission from the motor, suspension and support of said motor being such that some rotational movement of the motor is permitted and rotational motor vibration transmission to the bracket is minimized.

2. The assembly of claim 1 wherein said bracket is ring shaped and a wheel fan is attached to the shaft.

3. An improved motor mount assembly for motors of the type having a housing with a generally cylindrical configuration, opposed end plates and a drive shaft extending outward from one end plate along the axis of rotation of the cylindrical housing, said assembly comprising, in combination:

a louvered panel having a solid center section and louvers defined circumferentially about the center section;

a bracket attached to the inside of said panel including a portion substantially surrounding the center section;

cable means connecting one end plate with the bracket; and means for maintaining the other end plate within the bracket mounted in opposed relation to the panel center section whereby the center section provides a rain shield for the motor to cooperate with said cable means to support the motor to prevent noise and vibration transmission from the motor.

4. The improvement of claim 3 wherein a bladed fan is attached to the motor shaft, with a plurality of fan blades, said fan operative to push air through the louvers, said louvers being inclined substantially at the same angle as air flow from the fan blades.

5. An improved motor mount assembly for fan motors of the type having a housing with a generally cylindrical configuration, opposed end plates and a drive shaft extending outwardly from one end plate along the axis of rotation of the cylindrical housing, said assembly comprising, in combination:

an end panel mounted in opposed relation to one end plate of the motor;

a bracket attached to the panel and surrounding the motor, said bracket forming a plane generally perpendicular to the axis of rotation;

a plurality of cables connecting the other end plate with the bracket;

simultaneously maintaining the one end plate in opposed relation with the panel to cooperate with said cables to support the motor to prevent noise and vibration transmission from the motor.

6. The assembly of claim 5 wherein said means includes resilient material intermediate the end panel and adjacent plate.

7. The assembly of claim 5 wherein said bracket is comprised of four bracket members, each member having a bracket section and a brace section, said bracket sections being connected to form the bracket surrounding the motor.

8. The assembly of claim 5 wherein said end panel is a louvered panel, said louvers inclined substantially at the same angle as air discharged from said fan.

9. The assembly of claim 8 wherein said panel louvers define openings surrounding a center section so that the end plate of the motor is adjacent the center section and air flow encircles the motor through the louvers.

* * * * *